March 28, 1961  J. W. LOWRY  2,977,255
RECLAMATION METHOD
Filed Jan. 24, 1955  2 Sheets-Sheet 1
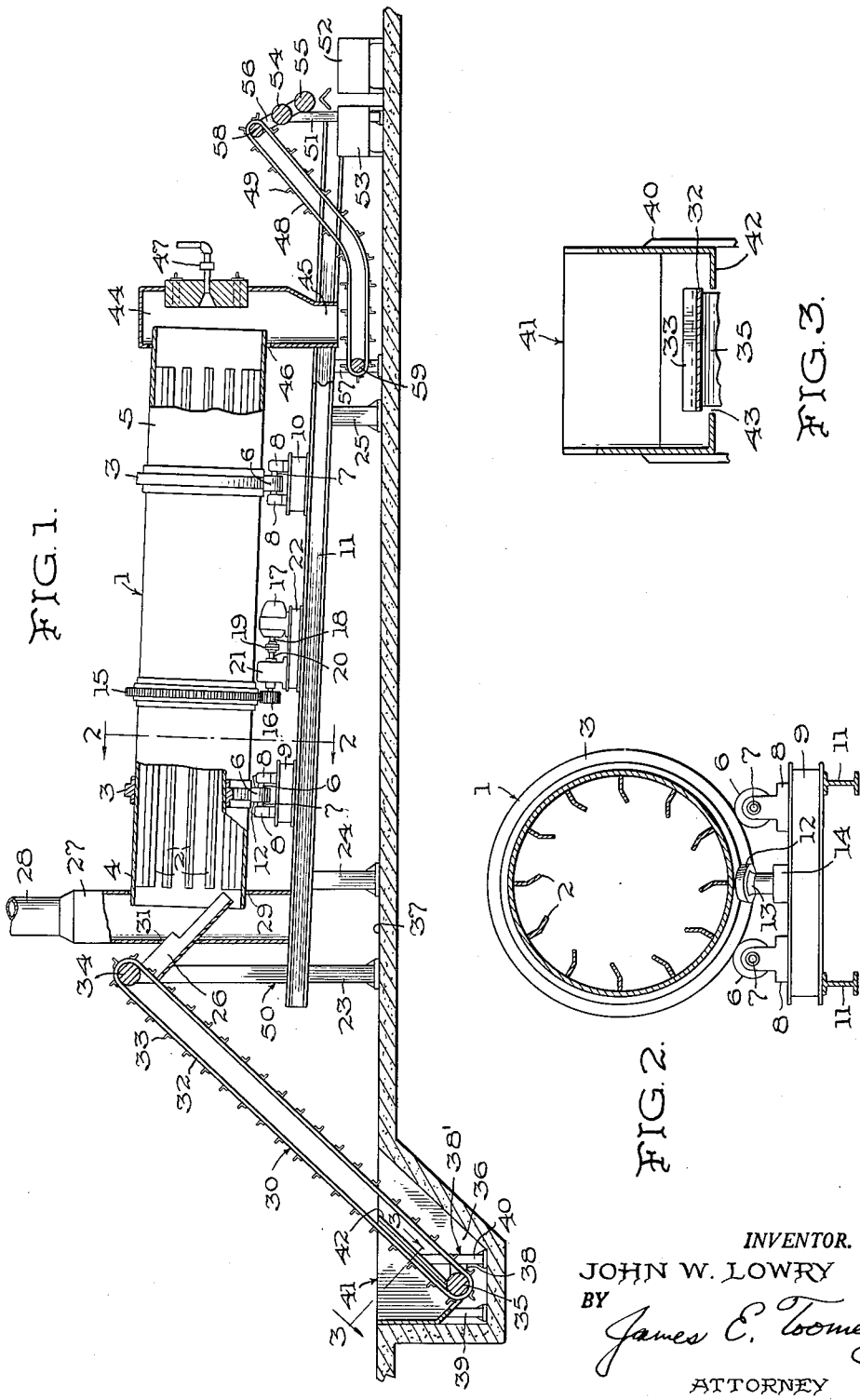
INVENTOR.
JOHN W. LOWRY
BY
James E. Toomey
ATTORNEY

INVENTOR.
JOHN W. LOWRY

United States Patent Office 2,977,255
Patented Mar. 28, 1961

2,977,255
RECLAMATION METHOD

John W. Lowry, Dishman, Wash., assignor to Kaiser Aluminum & Chemical Corporation, Oakland, Calif., a corporation of Delaware Filed Jan. 24, 1955, Ser. No. 483,612

8 Claims. (Cl. 134—2)

This invention relates to improvements in the art of reclaiming metal from metal having non-metallic combustible substances adhering thereto. More particularly, this invention relates to removal of insulation from scrap aluminum conductor wire for reclamation of such wire and to a novel method for accomplishing the desired results.

At the present time, rubber, neoprene, polyvinyl chloride, polyethylene and other types of elastomers and polymeric substances are used in the insulation of aluminum conductors for various end uses in the electrical industry. As in most manufacturing processes, the fabrication of insulated conductors results in a certain amount of rejected scrap material. Also, scrap material results from damage during installation and operation of electrical systems utilizing these insulation-covered conductors. The increasing amount of scrap aluminum conductor wire due to increased use of same and damage to conductors previously in use has presented a considerable problem to the industry due to lack of a method for reclaiming the conductor wire from the scrap which is particularly attractive to the industry from the standpoint of cost and which would give further incentive to increased use of aluminum conductor wire.

In general, scrap insulated conductor will be found in the form of masses such as loose strands, cables, tangled coils and bales. While the removal of insulation from masses, e.g. bales, of scrap aluminum electrical conductor wire for the reclamation of such wire has always been desirable, the prior art practices have failed to do so in a practical and efficient manner. One practice proposed for removal of insulation from conductor wire generally comprised stripping individual conductors. In such practice each conductor wire is treated individually making it a costly procedure even on loose conductor wires and completely unsatisfactory in the case of bales, tangled coils and cables where the scrap would first have to be separated into individual strands prior to treatment.

Accordingly, the primary purpose and object of this invention is to provide an improved method for reclaiming metal from metal having non-metallic combustible substances adhering thereto.

Another object of this invention is to provide an improved method for reclaiming a low melting point metal such as aluminum metal from masses of insulated low melting point metal such as insulated aluminum wire.

Another object of this invention is to provide an improved method for removing insulation from masses of aluminum electrical conductor wire for reclamation of aluminum metal.

Another object of this invention is to provide an improved method for burning and removing insulation from masses of aluminum conductor wire.

Another object of this invention is to provide a continuous method for reclaiming aluminum metal from masses of insulated aluminum electrical conductor.

Other objects and advantages of this invention will be apparent from the following description thereof in conjunction with the accompanying drawings.

In accordance with this invention masses of aluminum conductor wire insulated with non-metallic combustible material are passed through a combustion zone. The passage of the composite material through the combustion zone is controlled such that all portions of the masses of insulated conductor wire are exposed to the atmosphere of the combustion zone in order to burn all the insulation and with little or no melting of the metal. Simultaneously with combustion, or upon exit from the combustion zone, the wire masses may be subjected to impact with a surface, e.g. vibrating means, tumbling means, etc., to assist in separating the insulation residue from the conductor wire. The resulting wire masses are then suitable for remelting and subsequent fabrication. In the event that a conductor product such as aluminum cable-steel reinforced (hereinaffter referred to as ACSR) is being processed, the present invention includes within the scope thereof the cutting of such material into relatively short lengths prior to passage into the combustion zone and treatment of same to magnetic separation upon exit from the combustion zone. As an alternative the cable may be heated in a suitable furnace to melt the aluminum and permit separation therefrom of the steel.

The accompanying drawings illustrate presently preferred means for carrying out the method of this invention for removing insulation from masses of scrap electrical conductor wire.

Figure 1 is a side elevational, view partly in section with parts removed for purpose of clarity, of a conventional rotary heating means as employed for carrying out the method of this invention.

Figure 2 is an enlarged, cross-sectional view of the rotary heating means of Figure 1 taken along the line 2—2 of Figure 1.

Figure 3 is an enlarged cross section of the hopper means of Figure 1 taken along the line 3—3 of Figure 1.

Figure 4:
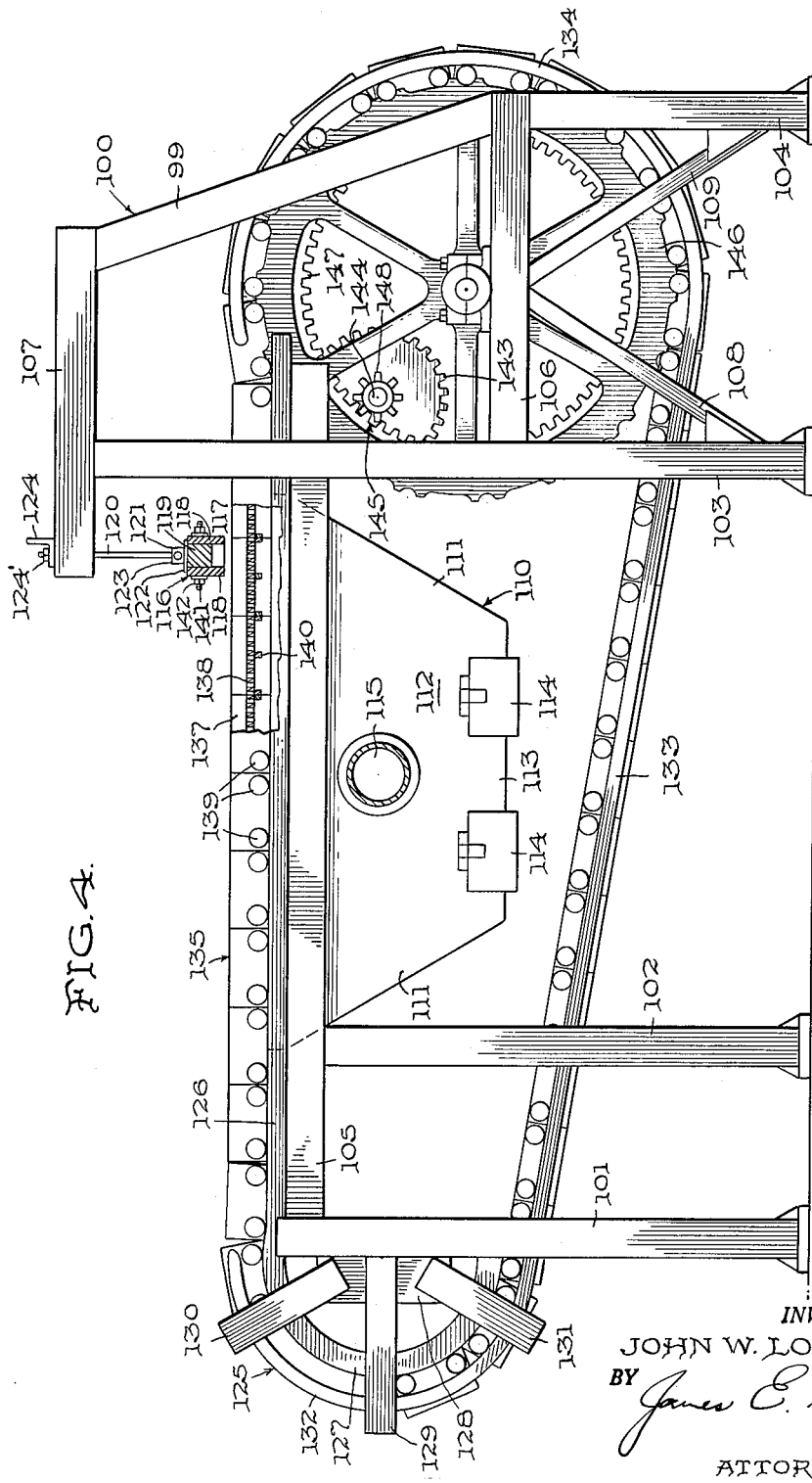
Figure 4 is a side elevation, partly in section, with parts removed for purpose of clarity, of another means for carrying out the method of this invention and including the use of a traveling grate and induced down draft.

Referring now more particularly to Figures 1, 2 and 3, there is shown a conventional rotary heating means for carrying out this invention. As shown, the apparatus generally comprises a suitable upstanding framework 50 which may support a conveyor roller 34, a chute 26, an elongated tubular shell 1, housings 27 and 44, a conveyor 48 and magnetic rolls 54 and 55. Framework 50 is composed of two spaced side assemblies which are rigidly connected by means of suitable cross members (not shown). Only one side assembly is shown and a description of one will suffice for both. Each side assembly is comprised of vertical members 23, 24, 25, 57 and 51, an elongated member 11 inclined several degrees to the horizontal, and a diagonal member 56. These members are suitably affixed together, as by welding, into a rigid framework.

Tubular shell 1 may be provided with vanes or lifting flights 2 positioned in spaced relationship about the inner periphery of the tubular shell and parallel to the axis thereof. Any suitable materials such as steel may be employed in the fabrication of the tubular shell and lifting flights 2. Upper and lower end portions 4 and 5, respectively, of tubular shell 1 may each be provided with a metal tire member 3 passing about the circumference of the tubular shell. Each metal tire member 3 is supported by a pair of rollers 6. Each roller 6 may in turn be provided with a suitable shaft 7 each of which is supported at either end by bearing block 8. Each set of bearing blocks 8 may in turn be bolted to its respective structural steel support 9 and 10, each of which is supported by elongated members 11. In order to prevent movement of tubular shell 1 in an axial direction which would result in tire members 3 sliding off of rollers 6, suitable rollers 12 having axes substantially vertical may be provided on either side of, and in rolling contact with, one of the tire members 3. Each roller 12 may be provided with a suitable shaft 13 and a vertical bearing block 14 suitably affixed to structural steel support 9.

In order to rotate tubular shell 1 a suitable ring type gear 15 may be provided around the outer periphery of the tubular shell in a position intermediate tire members 3. The teeth of gear 15 are engaged by a pinion 16 which is mounted on a shaft (not shown) which may be driven by a suitable motor 17 through a motor shaft 18, a coupling 19, a shaft 20, and a gear reducer 21. Motor 17 and gear reducer 21 may be attached to a suitable structural steel support 22 which can be supported by elongated members 11. Members 11 are supported by vertical members 23, 24, 25, 57 and 51 in such a manner that tubular shell 1 is inclined several degrees to the horizontal whereby material fed in at the end of higher elevation, i.e. upper end portion 4, will gradually move toward the end of the lower elevation, i.e. lower end portion 5, upon rotation of the tubular shell.

At the upper end portion 4 is provided a suitable chute 26 into the tubular shell. Surrounding chute 26 is a suitable housing 27 having a stack 28 at the upper portion thereof to permit egress of various fumes. The right hand side of housing 27 has a circular opening 29 slightly larger than the outside diameter of upper end portion 4 to permit passage thereof into housing 27 for a short distance with freedom to rotate.

A suitable elevating conveyor 30 may be provided for feeding the material to tubular shell 1 by means of chute 26. An opening 31 opposite circular opening 29 is provided in housing 27 to permit chute 26 to pass into housing 27, thereby permitting material from the upper end of conveyor 30 to fall into chute 26 and pass into the upper end portion 4 of the tubular shell. Elevating conveyor 30 may be any conventional type having a belt 32 with lighting flights 33, or similar devices, running transverse to the length of the belt 32, provided thereon for lifting the material. Belt 32 is supported by and passes around a roller 34 positioned immediately above chute 26. A similar roller 35 is positioned in a pit 36 which may be below the level of the operating floor 37. Roller 34 may be supported by an axial shaft (not shown) which in turn may be supported by suitable bearing blocks (also not shown) which are affixed to the upper end of vertical members 23. Similarly, roller 35 may be supported by an axial shaft (not shown) which in turn may be supported by bearing blocks (also not shown) affixed to suitable horizontal members 38 of a suitable upstanding framework 38'. Framework 38' is composed of two spaced side assemblies which are rigidly connected by means of suitable cross members (not shown). Only one side assembly is shown and a description of one will suffice for both. Each side assembly is comprised of vertical members 39 and 40 and horizontal member 38. These members are suitably affixed together, as by welding, into a rigid framework. A suitable hopper 41, supported by framework 38', may be provided for loading material onto conveyor 30. One side 42 of hopper 41 has an opening 43 within which belt 32 is fitted in such a manner as to form a portion of the side 42 of hopper 41. Thus, when large masses of scrap wire are dumped into hopper 41, movement of belt 32 with lifting flights 33 will cause the masses of wire to be carried up and over the upper roller 34 from which they drop into chute 26.

At the lower end 5 of tubular shell 1 may be provided a suitable housing 44, having a suitable discharge outlet 45. One end of housing 44 has a circular opening 46 slightly larger than the diameter of tubular shell 1 to permit passage of lower end portion 5 thereof into housing 44 for a short distance with freedom to rotate therein. A suitable burner 47 (oil, gas, etc.) is provided in the opposite end of housing 44. Burner 47 may be of conventional design and, therefore, will not be described in detail. Burner 47 is so positioned that the flame is directed axially through tubular shell 1 thereby heating the material contained therein.

A suitable receptacle, or conveyor belt may be provided beneath outlet 45 to receive the treated material. In addition, where desired, a vibrating screen may be provided at the discharge end to ensure complete separation of the charred insulation residue from the metal wire. For treatment of ACSR suitable means can be provided for separation of the ferrous metal from aluminum metal. One such means may comprise a suitable conveyor belt 48 having lifting flights 49, conveyor belt 48 being of conventional construction wherein the discharge end is supported by a roller 58 and the feed end is supported by a roller 59. Roller 58 may be supported by diagonal members 56 through suitable axle and bearing means (not shown). Similarly, roller 59 may be supported by vertical member 57. Immediately below the discharge end of conveyor belt 48 may be provided a suitable magnetic separating means such as magnetic rolls 54 and 55 for removing or separating ferrous metal from aluminum. Rolls 54 and 55 may be rotatably mounted on diagonal members 56, and driven in a counterclockwise direction whereby the ferrous metal drops into container 53 while the aluminum drops into container 52.

While the above apparatus has been described as a tubular shell rotary heating means, it may be desirable to line said tubular shell with refractory material since a substantial amount of heat is evolved by combustion of the insulation. In this way the cost of heating can be reduced. When such an apparatus is so lined it is generally referred to as a kiln.

The method of this invention when employed in conjunction with the rotary heating means of Figures 1, 2 and 3 will now be described.

The scrap insulated wire is dumped into hopper 41 whereupon it is conveyed by elevating conveyor 30 to the chute 26. The material such as masses of aluminum conductor drops off the upper end of elevating conveyor 30 into chute 26 from which it passes into the upper end portion 4 of tubular shell 1. In tubular shell 1 the material is ignited by the heat from burner 47. While burner 47, as shown and described above, is located in housing 44 at the discharge end of tubular shell 1, it may be located at the inlet end of the tubular shell 1 since it functions principally as an ignition means. Once the insulation is ignited it will continue to burn without the continued application of external heat. Fuel may be supplied to burner 47 at a rapid rate when starting up the apparatus, but as the gases are generated from the covering material, they actually furnish most of the combustion fuel and the burner fuel may then be throttle down to balance conditions. The rate of travel and quantity of material passing through tubular shell 1 is controlled such that the metal passes through the rotary heating means without melting, while the insulation is burned to destruction. This is determined by such factors as feeder conveyor speed, and length, diameter, angle of inclination, and speed of rotation of tubular shell 1. The selection of a desirable combination of these factors can be readily determined with a nominal amount of trial and error experimentation in any given case. After passage through tubular shell 1 the treated wire passes through outlet 45 either directly into a container or onto a conveyor belt for transfere elsewhere. Although not necessary for satisfactory practice of the present invention, it may be desirable in certain instances to cut or chop the wire masses into short lengths, e.g. 4 inches to 1½ feet, prior to feeding the same into the rotary heating means. This is particularly helpful when processing scrap wire such as ACSR where it is desired to accomplish separation of the ferrous metal from the aluminum metal by magnetic means wherein use can be made of means such as conveyor belt 48 in combination with magnetic rolls 54 and 55.

Another means for carrying out the present invention is illustrated in Figure 4, which is a conventional traveling-grate type of heating means including conventional overhead igniting means and an induced down draft. As shown, the apparatus generally comprises a suitable upstanding framework 100 which supports a suction box 110, an igniter 116, a track assembly 125, a series of grate bottom pallets 135 and a drive means 145 for driving pallets 135. Framework 100 is composed of two spaced side assemblies which are rigidly connected by means of suitable cross members (not shown). Only one side assembly is shown and a description of one will suffice for both. Each side assembly is comprised of vertical members 101, 102, 103, and 104, horizontal members 105, 106, and 107 and 129 and angularly disposed members 99, 108, 109, 130 and 131. These members are suitably affixed together, as by welding, into a rigid framework.

Track assembly 125 is composed of two spaced side assemblies each supported by framework 100. Only one side assembly is shown in Figure 3 an a description of on will suffice for both. Each side assembly comprises a horizontal track element 126 supported by the upper portion of framework 100 and a semi-circular track element 127 forming a continuation of horizontal track element 126 at the left end portion of framework 100. Affixed to vertical frame member 101 is a plate 128 and attached to plate 128 is horizontal frame member 129 and angularly disposed frame members 130 and 131. A semi-circular track element 132 is supported by frame members 129, 130, 131 and 101 in spaced relationship to track element 127, the center of curvature of track element 132 coinciding with that of track element 127. Along the lower portion of framework 100 is an angularly disposed straight track element 133 forming a continuation of semi-circular track element 132. Attached to the end portion of track element 133 furthest removed from track element 132 is a semi-circular track element 134.

Supported by track assembly 125 are a series of pallets 135 each of which comprises a pallet casting having horizontal bottom support bars 140 and vertical side portions 137. The open bottom of the pallet casting is fitted with grate members 138 which rest on support bars 140. The ends and bottoms of the pallets 135 are machined to assure tight fitting joints between adjacent pallets and between pallets and the top of the suction box 110. On each side of each pallet 135 are provided a pair of suitable rollers or wheels 139 adapted to roll on track assembly 125. On the upper portion of the apparatus rollers 139 roll in engagement with and rest on horizontal track elements 126. At the left hand end portion of framework 100 rollers 139 pass with a small amount of clearance between semi-circular track elements 127 and semi-circular track elements 132. Along the lower portion of steel frame 100, rollers 139 rest on angularly disposed track elements 133.

Movement of pallets 135 is maintained by suitable drive means 145 comprising a pair of spaced sprockets 146 and suitable gearing including a large internal gear 147 of a diameter substantially the same as sprocket 146 and either integral with or rigidly affixed thereto. Internal gear 147 may be driven by a suitable pinion 148 which may be keyed to a suitable shaft 144 having a large gear 143 also keyed thereto. Large gear 143 can be driven by suitable additional reduction gearing (not shown) which in turn can be driven by a suitable motor (not shown). The rate of rotation of sprockets 146 may be controlled by either a suitable gearshift incorporated in the reduction gearing or by the use of a variable speed motor. Sprockets 146 engage the rollers 139 to lift the pallets 135 from track elements 133 and push them forward along upper horizontal track elements 126 during operation of the apparatus. Thus, while on this upper track the machined joints between adjacent pallets are kept tightly sealed by the pressure of the following pallets as the train of pallets is pushed slowly over the suction box 110. At the discharge end the pallets are pushed off one by one over the brink formed by semi-circular track elements 127, roller 139 and pallets 135 being retained by semi-circular track elements 132. There is generally an open space provided in the track assembly down which each pallet 135 plunges to strike against the end of the preceding pallet 135, the impact discharging the material and cleaning the slots of the grate member 138. The pallets then return down the angularly disposed track member 133 generally by gravity as shown, although they may be pushed along by a second pair of sprocket wheels, where desired.

Suction box 110 may be comprised of suitable end members 111 which may be sloping, side members 112 and a bottom member 113, the top portion of suction box 110 being open and positioned just below pallets 135. This position is such that the pallet bottoms just clear the top of suction box 110. Clean-out doors 114 may be provided at the bottom of suction box 110 for cleaning. A suitable pipe duct 115 is provided on one side of suction box 110 which can be connected to an induced draft fan or similar suction derive (not shown). Suction box 110 may have one section as shown in Figure 3 or several sections depending on the length of the machine desired.

The igniter 116 is positioned above the pallets at the forward end of the suction box 110 and serves to set fire to the surface of the charge as it enters the suction zone. It may be fired with any suitable fuel, e.g. gas, oil, coal, etc., and the type of igniter employed will depend on the type of fuel used. The igniter itself consists essentially of a fire box or burner of a suitable type (not shown) and a muffle or inverted trough 117 that deflects the hot products of combustion uniformly across the surface of the charge on the pallets and also protects the workmen in adjacent structures from the heat. It is placed near the edge of the suction box 110 over which the insulated wire to be treated first passes and above and at right angles to the direction of motion of the pallets. Thus, the hot gases which are blown into the muffle at high pressure are drawn against and into the charge by the suction of the fan (not shown) thereby igniting the charge evenly across its exposed surface. For use with crude oil, a muffle of the design shown in Figure 3, numeral 117 is frequently used, the oil burner being placed at or just inside one end of the muffle. Since the muffle 117 as shown in Figure 3 is in cross-section, the portion in which the burner is mounted is not shown. The muffle 117 shown in the drawing comprises two elongated slabs of refractory material 118, and a shorter but wider slab of refractory material 119, sandwiched between slabs 117 and held together by a plurality of bolts 141, passing entirely through the slabs, and corresponding nuts 142. Igniter 116 is supported from horizontal member 107 by means of at least two rods 120 which are fastened to a pair of short pieces of angle iron 121 which are in turn fastened to a plate 122 suitably affixed within the refractory slabs 118 and 119, said connection being made by suitable bolt means 123. The upper end of rods 120 may be threaded and passed through suitable openings in an angle iron 124 and held in position by a nut 124′, angle iron 124 being suitably affixed to horizontal members 107.

Control of combustion in this machine may be effected by control of the rate of travel of the pallets 135 across suction box 110 and by control of the draft in suction box 110. Control of the rate of travel of pallets 135 is controlled by controlling the rate of rotation of sprocket 146.

The method of this invention will now be described with reference to traveling-grate type of apparatus as shown in Figure 4. The large masses of scrap insulated aluminum wire are first placed on the pallets 135 at the right of the igniter 116. The charge of scrap may be in the form of chopped lengths of scrap wire, large tangled masses of scrap wire, or bales or coils of scrap wire. Combustion is initiated in the combustible insulating material as the pallets containing the insulated wire which are traveling to the left pass under the igniter. The combustion travels down through the charge under the influence of the downdraft caused by the suction on suction box 110. The products of combustion are exhausted by the fan (not shown) through the suction box 110, duct 115 and a stack (not shown). The rate of travel of the pallet trains is controlled by controlling the rate of rotation of sprockets 146 such that the combustible insulation material is completely burned with no or insignificant melting of the wire metal as each pallet 135 reaches the opposite end of the suction box 110. The pallets 135 as previously noted, drop by gravity around semi-circular track elements 127 and 132, become inverted and dump their load. It has been found that the dropping of the treated wire off the pallet to the floor is often sufficient to shake loose all the insulating material residue and that the scrap wire is then ready for charging to a remelt furnace. However, in certain instances, as in the case of dense bales of scrap wire, the processed wire may be passed over a suitable vibrating screen means, e.g. punched plate type of screen or woven wire screen vibrated with a suitable vibrator, which will ensure separation of the charred residue from the wire, the wire then being suitable for processing in a remelt furnace. This device may also be employed for processing ACSR conductor wire, that is, aluminum wire having ferrous metal reinforcing. Where the wire is processed in the form of short lengths, the treated wire may be passed over magnetic separators similar to that described in connection with the rotary heating apparatus.

The following are specific examples of various tests of the present invention with use of the traveling-grate type of apparatus, but it is to be understood that this is by way of illustration rather than limitation.

The apparatus used had grates 24" wide and a suction box 9' long. Neoprene wire was processed and included both lengths of loose wire and bales. This scrap wire contained wire of varying gauges in both solid and stranded types. A draft of from about 1" to 3" of water was employed. Six tests were made and the data obtained is set forth in the following table:

| Test No. | Type of Charge | Approx. Bulk Density, lb/cu. ft. | Lb. Wire Feed/sq. ft./hr. | Remarks |
|---|---|---|---|---|
| 1 | Loose | 20 | 110 | Burned insulation-residue fell off on discharge of wire from pallet. |
| 2 | do | 12 | 95 | Do. |
| 3 | Baled | 25 | 69 | Do. |
| 4 | do | 33 | 77 | Burned insulation-residue removed on subjecting bale to impacts. |
| 5 | do | 42 | 69 | Burned insulation-residue difficult to remove entirely even after repeated impacts. |
| 6 | do | 45 | 69 | Burned insulation-residue only removed in outside layers of wire after repeated impact. |

As can be seen from the above table, the degree of removal of charred residue from the scrap wire was directly influenced by the density of the charge. In the case of loose wire, the residue was easily removed by discharge of the wire charge from the pallets and impact on the floor. Baled wire with a bulk density on the order of 25 pounds per cubic foot was cleaned substantially to the same degree as the loose wire. In test number 4 insulated wire was baled to a bulk density of about 33 pounds per cubic foot. The additional compression necessitated several impacts, as by dropping on a concrete surface, before the residue could be shaken out. The wire in the bale was clean after such impact and in condition for charging to a scrap remelt furnace. The density of the bales of tests 5 and 6 was found to be excessive. Though the insulation has been thoroughly charred even in the center of the bales, it was found difficult to remove all residue from bales of test 5 even after repeated impacts on a concrete surface and in the case of test 6 only the outside layers of wire could be cleaned of residue even after numerous steps of dropping the bales on a concrete surface. The rate of travel of the pallet train and induced down draft were so adjusted that all the insulation was completely burned with no melting except for a very small amount on wire passing closest to the igniter. This rate of travel varied in accordance with the density of the material processed.

It will thus be seen that the present invention provides a simple yet effective method for reclaiming the metal portions from metal having combustible material adhering thereto and is eminently suited for reclamation of aluminum from insulated aluminum conductor wire. It will be understood that although the present invention has been described with reference to particular forms of rotary heating means and traveling-grate type heating means that other forms of rotary heating means or traveling-grate means may be employed for carrying out the invention.

While there has been shown and described hereinabove the present preferred embodiments of this invention, it is to be understood that the invention is not limited thereto and that various changes, alterations and modifications can be made thereto without departing from the spirit and scope thereof as defined in the appended claims, wherein:

What is claimed is:

1. A process for continuously removing non-metallic combustible insulation from masses of an insulated low melting point metal conductor to which said insulation adheres for reclamation of the metal, comprising the steps of igniting said insulation and continuously passing said masses of conductor through a combustion zone and controlling the rate of travel of the masses through said combustion zone and the temperature of combustion to which said masses are exposed such that said metal conductor passes through said combustion zone without substantial melting while said insulation is burned to destruction therein and impacting the residual material with a surface to separate the burned insulation residue from the metal.

2. A process of continuously removing non-metallic combustible insulation from masses of insulated aluminum conductor to which said insulation adheres for reclamation of the aluminum metal, comprising the steps of chopping said masses of conductor into short lengths, igniting said insulation and continuously passing said short lengths of conductor through a combustion zone maintained at a temperature sufficient to burn said insulation, exposing all portions of said masses of conductor to the atmosphere of said combustion zone, controlling the rate of travel of said lengths of conductor through said combustion zone such that said aluminum metal passes therethrough without melting while said insulation is burned to destruction therein and impacting the residual material with a surface to separate the burned insulation residue from the metal.

3. A continuous method of removing non-metallic combustible insulation from masses of insulated aluminum conductor to which said insulation adheres for reclamation of the aluminum metal, comprising the steps of igniting said insulation and passing said masses of conductor through a combustion zone, forcing air for combustion to pass directly through said masses of conductor, controlling the rate of travel of the said masses through said combustion zone and the rate of flow of air through said masses of conductor such that said aluminum metal passes through said combustion zone without melting while said insulation is burned to destruction therein, and thereafter separating the burned insulation residue from the metal by impacting the residual material with a surface.

4. A method of removing non-metallic combustible insulation from insulated aluminum conductor wire to which said insulation adheres for reclamation of the aluminum metal comprising the steps of compressing said aluminum conductor wire into compact bales having a bulk density of not more than about 33 pounds per cubic foot, igniting said insulation and continuously passing said baled masses of conductor wire through a combustion zone, forcing air for combustion to pass directly through said masses of conductor wire, controlling the rate of travel of the said masses through said combustion zone and the rate of flow of air through said masses of conductor wire such that said aluminum metal passes through said combustion zone without melting while said insulation is burned to destruction therein and separating the burned insulation residue from the metal.

5. A continuous method of recovery of aluminium from scrap aluminium insulated conductor comprising the steps of chopping said conductor into short lengths, heating said lengths of scrap conductor in a rotary heating means to ignite the insulation, passing said short lengths of conductor through said rotary heating means and exposing all portions of said conductor to the atmosphere of said rotary heating means by rotating said rotary heating means, controlling the rate of travel of the conductor through said rotary heating means such that the aluminum passes through said rotary heating means without melting while said insulation is burned to destruction therein and impacting the residual material with a surface to separate the burned insulation residue from the aluminum.

6. A method of reclamation of metal from scrap metal conductor wire having non-metallic insulation material adhering thereto comprising the steps of compacting the insulated conductor wire into bales having a bulk density of not more than about 33 pounds per cubic foot, exposing said bales to a combustion heat thereby igniting said non-metallic insulation material, passing said bales through a combustion zone wherein air is passed downwardly through said bales, controlling the rate of travel of said bales through said zone and the rate of downward passage of air through said bales such that the metal passes through said combustion zone without melting while said insulation material is burned to destruction and separating the burned insulation material residue from the metal by impacting said bales with a surface.

7. In the operation of a forced down draft traveling grate heating means for reclamation of a metal from bales of metal conductor wire having neoprene insulation adhering thereto and having a bulk density of not more than about 33 lbs./cu. ft., the method which comprises the steps of placing said bales on said traveling grate, igniting said combustible insulation material, passing said bales through a combustion zone wherein air is passed downwardly through said bales by induced draft, said draft being from about 1" to 3" of water, controlling the rate of travel of said bales such that the metal passes through said combustion zone without melting while said insulation is burned to destruction, discharging said bales from said grate and separating the burned insulation residue from the metal.

8. In the operation of a forced down draft traveling grate heating means for reclamation of metal from bales of metal conductor wire having neoprene insulation adhering thereto and having a bulk density of not more than 25 lbs./cu. ft., the method which comprises the steps of placing said bales on said traveling grate, igniting said combustible insulation material, passing said bales through a combustion zone wherein air is passed downwardly through said bales by induced draft means, said draft ranging from about 1" to 3" of water, controlling the rate of travel of said bales such that the metal passse through said combustion zone without melting while said insulation is burned to destruction, discharging said bales from said grate, and separating the burned insulation residue from the metal.

References Cited in the file of this patent

UNITED STATES PATENTS

| | | |
|---|---|---|
| 1,136,110 | Eberhart | Apr. 20, 1915 |
| 1,370,090 | Clark | Mar. 1, 1921 |
| 1,655,608 | Hyde | Jan. 10, 1938 |
| 1,869,844 | Derr | Aug. 2, 1932 |
| 1,869,886 | Derr | Aug. 2, 1932 |
| 2,091,850 | Gohre | Aug. 31, 1937 |
| 2,142,875 | Schmeller | Jan. 3, 1939 |
| 2,192,056 | Watts | Feb. 27, 1940 |
| 2,291,862 | Bailey | Aug. 4, 1942 |
| 2,302,980 | Stern | Nov. 24, 1942 |
| 2,302,981 | Stern | Nov. 24, 1942 |
| 2,386,835 | Beatty | Oct. 16, 1945 |
| 2,432,868 | Earl et al. | Dec. 16, 1947 |
| 2,478,461 | Connolly | Aug. 9, 1949 |
| 2,563,085 | Utsinger | Aug. 7, 1951 |
| 2,571,328 | Baker | Oct. 16, 1951 |
| 2,633,428 | Klug | Mar. 31, 1953 |
| 2,704,249 | Mushovic | Mar. 15, 1955 |

FOREIGN PATENTS

| | | |
|---|---|---|
| 603,046 | Great Britian | June 8, 1948 |

UNITED STATES PATENT OFFICE
CERTIFICATE OF CORRECTION

Patent No. 2,977,255                           March 28, 1961

John W. Lowry

It is hereby certified that error appears in the above numbered patent requiring correction and that the said Letters Patent should read as corrected below.

Column 2, line 18, for "hereinaffter" read -- hereinafter --; column 3, line 15, for "18." read -- 18, --; line 42, for "lighting" read -- lifting --; same column 3, line 47, for "37," read -- 37. --; column 4, line 69, for "transfere" read -- transfer --; column 5, lines 23 and 24, for "Figure 3 an a description of on" read -- Figure 3 and a description of one --; column 6, line 25, for "derive" read -- device --; column 7, line 42, for "Neoprene wire" read -- Neoprene-covered wire --; column 9, lines 21 and 22, for "aluminium from scrap aluminium" read -- aluminum from scrap aluminum --; line 53, strike out "a"; column 10, line 25, for "passse" read -- passes --.

Signed and sealed this 27th day of February 1962.

(SEAL)
Attest:

ERNEST W. SWIDER                          DAVID L. LADD
Attesting Officer                       Commissioner of Patents